3,022,333
Patented Feb. 20, 1962

3,022,333
CATALYTIC ESTERIFICATION OF TEREPHTHALIC ACID
Charles D. Kalfadelis, Hammond, and Delbert H. Meyer, Highland, Ind., assignors to Standard Oil Company, Chicago, Ill., a corporation of Indiana
No Drawing. Filed Jan. 26, 1959, Ser. No. 788,726
9 Claims. (Cl. 260—475)

This invention relates to the esterification of aromatic carboxylic acids with primary aliphatic alcohols. More particularly, the invention relates to an improved catalyst system for this reaction.

Esters of aliphatic alcohols and aromatic carboxylic acids are widely used in industry, particularly as plasticizers or as intermediates for polyester resins. The rate of esterification is usually quite slow and catalysts have been used to increase this reaction rate. The commonly used active catalysts such as sulfuric acid, hydrochloric acid, and aluminum sulfate promote very rapid reaction rates but lead to considerable alcohol loss by ether formation. On the other hand, certain metal salts or oxides such as zinc oxide, antimony oxide and the like do not cause the formation of ethers but are rather mild esterification catalysts, thus requiring relatively longer reaction times.

An object of the invention is to provide a catalytic process for esterifying aromatic carboxylic acids with primary aliphatic alcohols. A particular object of the invention is a catalytic process for esterification of aromatic carboxylic acids with primary aliphatic alcohols wherein there is no significant loss of alcohol to ether formation. Other objects will become apparent in the course of the detailed description.

It has now been discovered that antimony oxide, in admixture with one or more of the first period heavy metals manganese, copper, and zinc, provides esterification rates considerably in excess of the rates provided by equivalent concentrations of any catalyst component by itself. These first period heavy metals may be in the form of a weak acid salt of the heavy metal, an oxide of the heavy metal, or an elemental form of the heavy metal. Thus the process of the instant invention prepares esters of aromatic carboxylic acids (or anhydrides thereof) with primary aliphatic alcohols which contain not more than about 16 carbon atoms in the presence of a catalyst consisting of a mixture of antimony oxide ($Sb_2O_3$) and at least one member of the class (1) weak acid salts of the heavy metals manganese, copper, and zinc, (2) oxides of said heavy metals, and (3) elemental forms of said heavy metals.

The improved catalyst system of this invention is useful in increasing the reaction rate of all aromatic carboxylic acids, or anhydrides thereof, with primary aliphatic alcohols which contain from 1 to about 16 carbon atoms. Examples of suitable aromatic carboxylic acids and anhydrides are: benzoic, toluic, phthalic, phthalic anhydride, isophthalic, terephthalic, trimesic, trimellitic, trimellitic anhydride, hemimellitic, hemimellitic anhydride, prehnitic, mellitic, naphthoic, naphthalic anhydride, diphenic, diphenic anhydride.

Suitable primary aliphatic alcohols are: methanol, ethanol, n-propanol, n-butanol, isobutyl, n-hexyl, n-octyl, lauryl, myristyl (n-dodecyl), cetyl (n-hexadecyl), isooctyl ($C_8$ Oxo), nonyl ($C_9$ Oxo), decyl ($C_{10}$ Oxo), and tridecyl ($C_{13}$ Oxo). As used herein Oxo alcohols are understood to be the product of the reaction of an olefin or mixture of olefins with carbon monoxide and subsequent hydrogenation of the aldehydes formed in the oxoation reaction. Many of these Oxo alcohols are now commercial products; the 8, 9, 10 and 13 carbon atom containing mixture of alcohols derived from a mixture of $C_7$, $C_8$, $C_9$ and $C_{12}$ olefin isomers respectively are available as isooctyl alcohol, nonyl alcohol, decyl alcohol and tridecyl alcohol, respectively. The catalyst of the instant invention is particularly suitable for reacting the various phthalic acids with methanol.

The antimony oxide is used in conjunction with a co-catalyst which is a member of the group consisting of (1) weak acid salts of the heavy metals manganese, copper, and zinc, (2) oxides of said metals, and (3) elemental forms of said metals. The terms "weak acid salts" or "salts of weak acids" are intended to include salts of organic or inorganic acids wherein the original acid has ionization constants lower than $10^{-3}$ at 25° C. in water. Both the weak acid salts and the oxides may be employed in anhydrous or hydrated form. Since the co-catalyst apparently must be in solution in order for there to be substantial promotion of the antimony oxide, elemental forms of these heavy metals are suitable since they are sufficiently soluble in the esterification reaction mixture under reaction conditions to effect noticeable rate improvement.

As illustrations of suitable co-catalysts, there are mentioned the following compounds. The list is not exhaustive.

| Heavy Metal | Oxides | Weak Acid Salts |
| --- | --- | --- |
| Manganese | MnO | $Mn(Acetate)_2.4H_2O$. $Mn(Lactate)_2.3H_2O$. |
| Copper | $Cu_2O$ CuO | $Cu(Acetate)_2.H_2O$. $Cu(Benzoate)_2.2H_2O$. |
| Zinc | ZnO $ZnO_2$ | $Zn(Stearate)_2$. $Zn(Acetate)_2$. |

Some variation exists among the various members of the foregoing grouping with respect to their ability for promoting the activity of antimony oxide. Zinc in particular, in the form of the elemental metal (e.g. zinc dust), its oxides or its weak acid salts, shows from about one to two percent higher carboxyl group conversion at given conditions than other co-catalysts. In addition, it appears to result in a lighter colored product than certain of the other co-catalysts. The activity of zinc does not diminish appreciably with time or use and accordingly zinc is of special utility in continuous esterification processes or in batch processes where the catalyst is to be recycled.

Although it is to be understood that the catalyst system of the invention is suitable for use with the defined acids and alcohols at various well known conditions of temperature, time of reaction, and ratios of alcohol to acid in the starting reaction mixture, for completeness a summary of operating conditions is set out herein. The esterification reaction is ordinarily conducted at a temperature between about 140° C. and 350° C. and at pressures of at least about atmospheric. The reaction may be carried out until the desired degree of conversion of carboxyl groups or equilibrium condition has been reached; this time is dependent upon the particular acid and particular alcohol present in the reaction zone. In general, the higher the temperature maintained in the reaction zone the shorter the time needed to reach the desired degree of carboxyl group conversion or equilibrium condition.

Theoretically only 1 mol of alcohol is needed for each mol of carboxyl groups to be esterfied, however, the degree of conversion and the conversion rate is improved by the presence of excess alcohol in the reaction zone. In general between about 2 and 30 mols of alcohol are present in the reaction zone per mol of carboxyl groups to be esterified.

The amount of each catalyst component present may be very small, for example, 0.0005 weight percent based on aromatic acid or anhydride in the reaction zone. Or the amount used may be quite large, amounting to five weight percent or more based upon acid present. Desirably, from about 0.01 to about 0.5 wt. percent of each component, based on acid or anhydride, is employed. The catalyst usually forms a slurry in the reaction zone; however, it is theorized that the actual catalytic effect is obtained by the very small amounts of antimony oxide and co-catalyst which are physically dissolved in the liquid material present in the reaction zone. The proportions of either catalyst component to the other may be either very large or very small, illustratively from about $\frac{1}{10}$ to 10 parts by weight of antimony oxide for each part by weight of co-catalyst. It has been found that more rapid reaction rates are attained when the concentration of co-catalyst is at least equal to that of $Sb_2O_3$; more desirably the co-catalyst predominates over the $Sb_2O_3$ concentration. When operating with terephthalic acid and methanol the catalyst usage is generally between about 0.01 and 0.5 weight percent each of antimony oxide and co-catalyst based on terephthalic acid.

As a specific illustration of a preferred embodiment of the invention, conditions for esterifying terephthalic acid with methanol are described. The terephthalic acid and methanol are charged to the reaction zone in a weight ratio of methanol to acid of between about 2 and 5; this corresponds to between 10 and 26 mols of methanol per mol of terephthalic acid charged. It is preferred to carry out the esterification reaction at a temperature between about 240° C. and 300° C. The amount of catalyst present appears to have no significant effect on the reaction rate as long as some catalyst is present. A carboxyl group conversion of about 90–95% of equilibrium is attained in a time of between about 10 minutes and 60 minutes, with the longer times corresponding to lower temperatures.

The invention may be illustrated with reference to the following examples, it being understood that they are illustrative only and are not to be considered exclusive in scope.

EXAMPLE I

To demonstrate the effect of zinc in promoting an $Sb_2O_3$ catalyst, studies were made on the degree of conversion of terephthalic acid and methanol at a standard temperature and time with zinc dust alone, with antimony oxide alone, and with mixed catalyst. These studies were carried out using as the reaction zone a glass tube having about 13.5 ml. volumetric space. The terephthalic acid and catalyst were weighed and the methanol was delivered volumetrically using a hypodermic syringe. The glass tube was then sealed by fusing the opening. The tube was placed in a constant temperature bath provided with a rocking and oscillating mechanism which mechanism kept the contents of the tube well intermingled. After the reaction zone had been agitated in the bath for the desired time it was removed from the bath and allowed to cool rapidly to room temperature. After the tube had reached room temperature it was opened and the contents transferred to a beaker; the tube was washed with 100 ml. of ethyl alcohol and 100 ml. of benzene to insure removal of all the material therefrom. The degree of conversion of the carboxyl groups to ester groups was determined by titration with 0.02 normal aqueous sodium hydroxide using phenol red as the indicator; when it was believed that the conversion was low, as shown by the presence of considerable solid material in the tube, the titration was carried out with 0.1 normal sodium hydroxide.

The presence of even small amounts of dimethyl ether in the tube is readily detected by the presence of pressure within the tube when the tube is opened. The escape of gaseous material at the moment of opening the tube is quite apparent. By this method of observation no dimethyl ether formation was apparent.

The results of eight tests are reported in Table 1 below. In all of the tests 4 parts by weight of methanol were present for each part of terephthalic acid (TPA). These tests were carried out at about 260° C. and for 20 minutes in order to compare the catalysts under reaction conditions which are equivalent to the normal commercial batch esterification reaction.

Table 1
ZINC METAL AS CO-CATALYST

| Test No. | Catalyst, Wt. Percent on Terephthalic Acid | | | Carboxyl Groups Converted, Percent |
|---|---|---|---|---|
| | Zn | $Sb_2O_3$ | Total | |
| 1 | 0.25 | 0.25 | 0.50 | 96.0 |
| 2 | 0.125 | 0.125 | 0.25 | 95.3 |
| 3 | 0.25 | | 0.25 | 90.0 |
| 4 | | 1.0 | 1.0 | 86.0 |
| 5 | | 0.50 | 0.50 | 86.7 |
| 6 | | 0.25 | 0.25 | 86.0 |
| 7 | | 0.16 | 0.16 | 86.3 |
| 8 | | 0.10 | 0.10 | 86.0 |

Tests 1 and 2, employing the mixed zinc dust-antimony oxide of the invention, indicate that from 95.3 to 96.0% of the carboxyl groups were converted after 20 minutes at 260° C. In test 3, only zinc dust was used as catalyst, and the carboxyl group conversion was 90.0%; thus at the 0.25% total catalyst level the mixed catalyst of this invention gives 5.3% higher conversion than zinc metal alone. In tests 4–8, antimony oxide was used alone at varying concentrations ranging from 0.10 to 1.0 weight percent on TPA, and the conversion ranged from 86.0 to 86.7%. Thus, a comparison of test 2 using the mixed catalyst with tests 4–8, shows that the present invention permits at least 8.6% higher conversion in 20 minutes than any concentration of antimony oxide used alone. It is noted that the concentration of antimony had substantially no effect on esterification reaction rate.

EXAMPLE II

In this example, a series of tests was conducted to demonstrate the superiority of a mixture consisting of zinc oxide and antimony oxide over either catalyst component alone. Reaction conditions were essentially those employed for Example I, and the following results were obtained.

Table 2
ZINC OXIDE AS CO-CATALYST

| Test No. | Catalyst, Wt. Percent on Terephthalic Acid | | | Carboxyl Groups Converted, Percent |
|---|---|---|---|---|
| | ZnO | $Sb_2O_3$ | Total | |
| 9 | 0.25 | 0.25 | 0.50 | 95.8 |
| 10 | 0.125 | 0.125 | 0.25 | 91.7 |
| 11 | 0.50 | | 0.50 | 91.1 |
| 4 | | 1.0 | 1.0 | 86.0 |
| 5 | | 0.50 | 0.50 | 86.7 |
| 6 | | 0.25 | 0.25 | 86.0 |
| 7 | | 0.10 | 0.10 | 86.0 |

Test 9, using 0.25 wt. percent on TPA each of zinc oxide and antimony oxide, gave a carboxyl group conversion of 95.8%. By contrast, at the same total catalyst concentration, 0.50%, zinc oxide alone converted only 91.1% of the carboxyl groups, and antimony oxide alone converted only 86.7%. Thus the improved catalyst resulted in at least 4.7% higher conversion than either component could provide by itself. Even when the total concentration of each catalyst component was reduced by half, viz. Test 10, the carboxyl group conversion was still 0.6% higher than that obtained in either test 11 with zinc oxide alone or in test 5 with antimony oxide alone, each with twice as much total catalyst.

EXAMPLE III

In this example the effect of a manganous acetate tetrahydrate co-catalyst together with antimony oxide was studied. Conditions were identical with those used in Examples I and II.

Table 3
MANGANOUS ACETATE AS CO-CATALYST

| Test No. | Catalyst, Wt. Percent on Terephthalic Acid | | | Carboxyl Groups Converted, Percent |
|---|---|---|---|---|
| | $Mn(Ac)_2 \cdot 4H_2O$ | $Sb_2O_3$ | Total | |
| 12 | 0.25 | 0.25 | 0.50 | [1] 93.7 |
| 13 | 0.28 | 0.06 | 0.34 | 94.1 |
| 14 | 0.20 | 0.05 | 0.25 | 94.1 |
| 15 | 0.125 | 0.125 | 0.25 | 89.8 |
| 16 | 0.05 | 0.20 | 0.25 | 89.8 |
| 17 | 1.0 | | 1.0 | 86.8 |
| 18 | 0.25 | | 0.25 | 90.0 |
| 19 | 0.20 | | 0.20 | 69.0 |
| 20 | 0.10 | | 0.10 | 65.4 |
| 4 | | 1.0 | 1.0 | 86.0 |
| 5 | | 0.50 | 0.50 | 86.7 |
| 6 | | 0.25 | 0.25 | 86.0 |
| 7 | | 0.16 | 0.16 | 86.3 |

[1] Test run for only 17 minutes.

Tests 12 through 16 were run using the improved mixed catalyst of the invention, tests 17 through 20 employed manganese acetate alone, and tests 4 through 7 used only antimony oxide. At the 0.50 weight percent total catalyst level (test 12), the mixture of manganese acetate and antimony oxide gave at least 4% higher conversion than even twice as much of either manganese acetate or antimony oxide used alone. Tests 13 and 14, in which the manganese acetate co-catalyst concentration predominated over the concentration of antimony oxide, the carboxyl group conversion was higher than in test 15 at about the same total catalyst concentration but with both catalyst components present in identical concentrations, and also was higher than the conversion in test 16 where the antimony oxide concentration predominated.

The results obtained in this example are especially noteworthy when it is considered that only 0.25% of the mixed catalyst (test 14) is capable of giving more than 4% higher conversion than even 4 times as much of either catalyst component alone (tests 4 and 17).

EXAMPLE IV

This example illustrates the improved results obtained with a mixture of cupric acetate monohydrate plus antimony oxide. The test procedure followed that employed in the previous examples.

Table 4
CUPRIC ACETATE AS CO-CATALYST

| Test No. | Catalyst, Wt. Percent on Terephthalic Acid | | | Carboxyl Groups Converted, Percent |
|---|---|---|---|---|
| | $Cu(Ac)_2 \cdot H_2O$ | $Sb_2O_3$ | Total | |
| 21 | 0.25 | 0.25 | 0.50 | 93.7 |
| 22 | 0.125 | 0.125 | 0.25 | 93.3 |
| 23 | 0.25 | | 0.25 | 87.5 |
| 4 | | 1.0 | 1.0 | 86.0 |
| 5 | | 0.50 | 0.50 | 86.7 |
| 6 | | 0.25 | 0.25 | 86.0 |
| 7 | | 0.16 | 0.16 | 86.3 |

Tests 21 and 22, using the improved catalyst of this invention at concentrations of 0.50 and 0.25 wt. percent total catalyst, respectively, showed conversions of 93.7 and 93.3%, respectively. By contrast, 0.25% of cupric acetate alone (test 23) displays only 87.5% conversion under the same conditions, while no concentration of antimony oxide alone can give more than 86.7%.

In none of the twenty-three above tests was any appreciable amount of ether formation detected.

We claim:

1. In a process for preparing dimethyl terephthalate by reacting terephthalic acid with methanol at a temperature between about 140° C. and 350° C. and at a pressure of at least about atmospheric, the improvement which comprises carrying out said reaction in the presence of a catalyst consisting essentially of (a) antimony oxide and (b) a member of the class consisting of manganous salts of weak acids, cupric salts of weak acids, zinc salts of weak acids, manganous oxide, cupric oxide, cuprous oxide, zinc oxide (ZnO), zinc oxide ($ZnO_2$), elemental manganese, elemental copper, and elemental zinc.

2. Process of claim 1 wherein said member is present in a concentration at least equal to the concentration of antimony oxide.

3. Process of claim 1 wherein the concentration of said member predominates over the concentration of antimony oxide.

4. Process of claim 1 wherein said member is a manganous salt of a weak acid.

5. Process of claim 4 wherein said salt is manganous acetate.

6. Process of claim 1 wherein said member is a cupric salt of a weak acid.

7. Process of claim 6 wherein said salt is cupric acetate.

8. Process of claim 1 wherein said member is zinc oxide (ZnO).

9. Process of claim 1 wherein said member is elemental zinc.

References Cited in the file of this patent

UNITED STATES PATENTS

| 2,465,319 | Whinfield et al. | Mar. 22, 1949 |
| 2,534,028 | Izard | Dec. 12, 1950 |
| 2,658,055 | Alderson | Nov. 3, 1953 |
| 2,739,957 | Billica et al. | Mar. 27, 1956 |
| 2,828,290 | Caldwell | Mar. 25, 1958 |
| 2,850,483 | Ballentine et al. | Sept. 2, 1958 |

FOREIGN PATENTS

| 783,814 | Great Britain | Oct. 2, 1957 |

OTHER REFERENCES

Groggins: "Unit Processes In Organic Synthesis," page 702, McGraw-Hill, 1958.

UNITED STATES PATENT OFFICE
CERTIFICATE OF CORRECTION

Patent No. 3,022,333                         February 20, 1962

Charles D. Kalfadelis et al.

It is hereby certified that error appears in the above numbered patent requiring correction and that the said Letters Patent should read as corrected below.

Column 3, line 52, before "tube" insert -- sealed --.

Signed and sealed this 19th day of June 1962.

(SEAL)
Attest:

ERNEST W. SWIDER
Attesting Officer

DAVID L. LADD
Commissioner of Patents